US005428494A

United States Patent [19]

Ahuja

[11] Patent Number: 5,428,494
[45] Date of Patent: * Jun. 27, 1995

[54] POWER LINE PROTECTOR, MONITOR AND MANAGEMENT SYSTEM

[75] Inventor: Om Ahuja, Bellaire, Tex.

[73] Assignee: Omtronics Corp., Bellaire, Tex.

[*] Notice: The portion of the term of this patent subsequent to Dec. 27, 2007 has been disclaimed.

[21] Appl. No.: 8,674

[22] Filed: Jan. 25, 1993

Related U.S. Application Data

[63] Continuation-in-part of Ser. No. 684,167, Apr. 11, 1991, abandoned, which is a continuation-in-part of Ser. No. 833,360, Feb. 25, 1986, abandoned, which is a continuation-in-part of Ser. No. 664,472, Oct. 24, 1984, abandoned.

[51] Int. Cl.⁶ .............................................. H02H 3/00
[52] U.S. Cl. .................................................... 361/62
[58] Field of Search ................... 361/62, 56, 57, 42, 361/65

[56] References Cited

U.S. PATENT DOCUMENTS

| 3,527,985 | 8/1970 | Brown | 317/16 |
|---|---|---|---|
| 3,793,535 | 2/1974 | Choudhuri | 307/202 |
| 4,068,279 | 1/1978 | Byrnes | 361/56 |
| 4,095,163 | 6/1978 | Montague | 323/8 |
| 4,212,045 | 7/1980 | Martzloff | 361/127 |
| 4,325,097 | 4/1982 | Clark | 361/56 |
| 4,348,707 | 9/1982 | Mauk et al. | 361/92 |
| 4,363,064 | 12/1982 | Billings et al. | 361/57 |
| 4,419,711 | 12/1983 | Seguin | 361/111 |
| 4,463,406 | 7/1984 | Sirel | 361/56 |
| 4,563,720 | 1/1986 | Clark | 361/56 |
| 4,628,394 | 12/1986 | Crosby et al. | 361/56 |
| 4,653,084 | 3/1987 | Ahuja | 379/29 |
| 4,677,518 | 6/1987 | Hershfield | 361/56 |
| 4,700,380 | 10/1987 | Ahuja | 379/177 |
| 4,701,946 | 10/1987 | Oliva et al. | 379/98 |
| 4,710,949 | 12/1987 | Ahuja | 379/26 |
| 4,796,150 | 1/1989 | Dickey | 361/119 |
| 4,816,957 | 3/1989 | Irvin | 361/45 |
| 5,198,957 | 3/1993 | Welty | 361/18 |

FOREIGN PATENT DOCUMENTS

| 1291207 | 10/1991 | Canada | H02H 9/04 |
|---|---|---|---|
| 0204723 | 5/1991 | European Pat. Off. | H02H 9/00 |
| 565-397 | 7/1977 | U.S.S.R. | |

Primary Examiner—Thomas M. Dougherty
Assistant Examiner—E. To

[57] ABSTRACT

A micro computer based power line protection, monitoring and management system that manages one or more source(s) and one or more user(s) of the power. Further disclosed are many means of rendering the surge protection operative in many different modes, and conditions, means of providing primary protection and secondary protection in a safe way such that the system integrity is maintained in that various situation/conditions of power surges, transients and crosses, further coupled with a power management system that allows safe switching between surges and manages different loads and provided by its predetermined parameters and conditions. External communication means additionally provide the means of controlling and monitoring the sources and the loads. Various control means and isolation means separate the primary from the secondary protector providing fail safe protection under varying power conditions such as power crosses, surges and transients. Furthermore, brownouts and blackouts are also prevented by managing the power sources. Intrinsically provided are other power management functions such as load sequencing and responding to external communications, timers and time delays, etc.

19 Claims, 13 Drawing Sheets

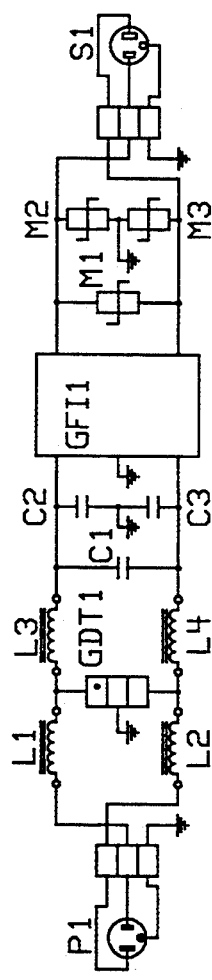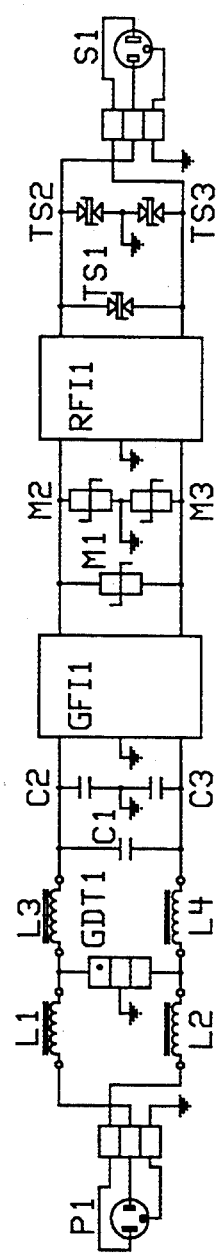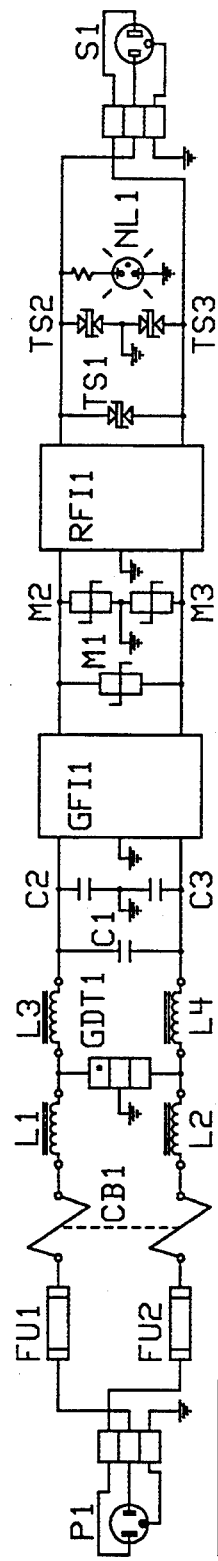

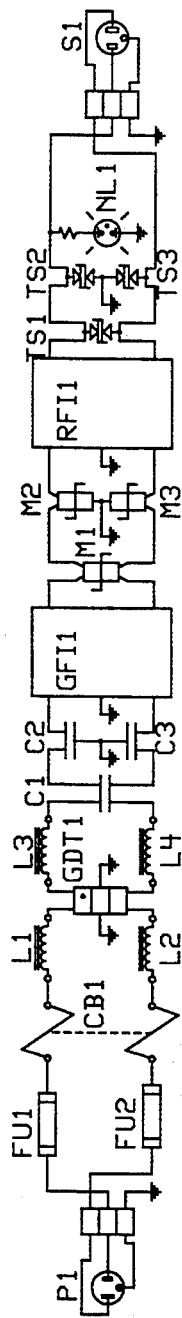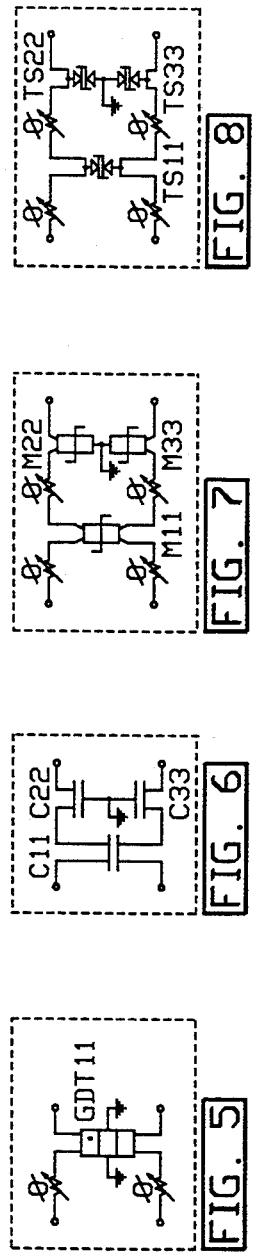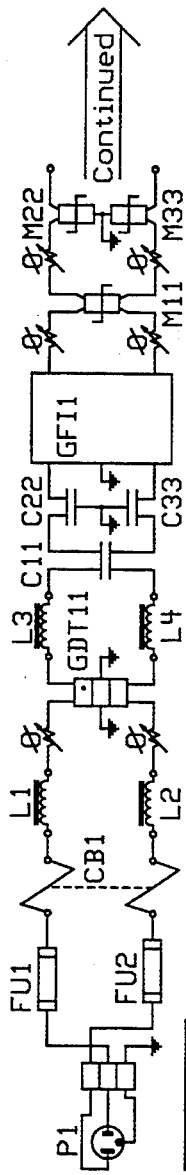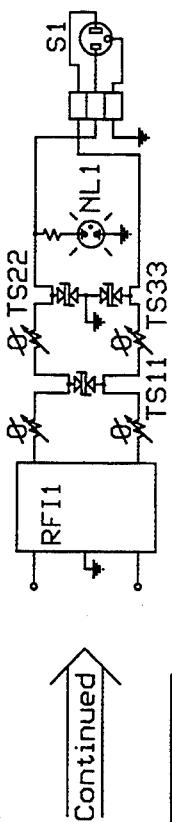

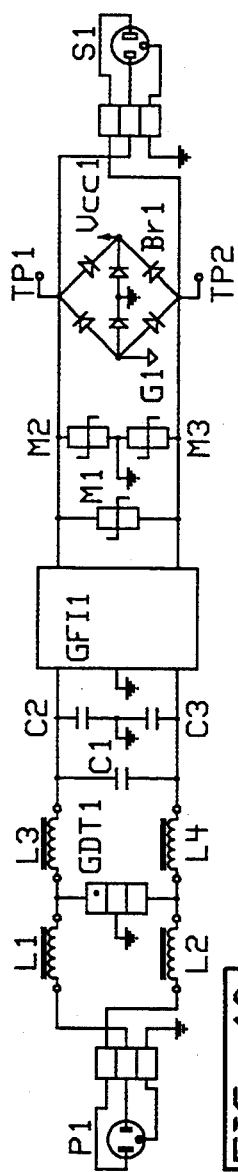
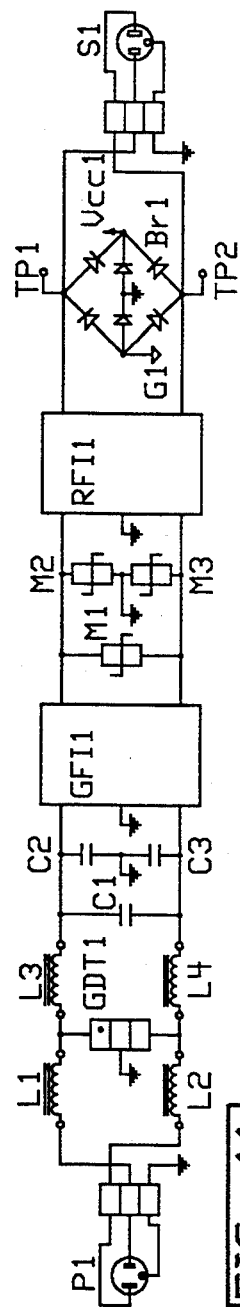
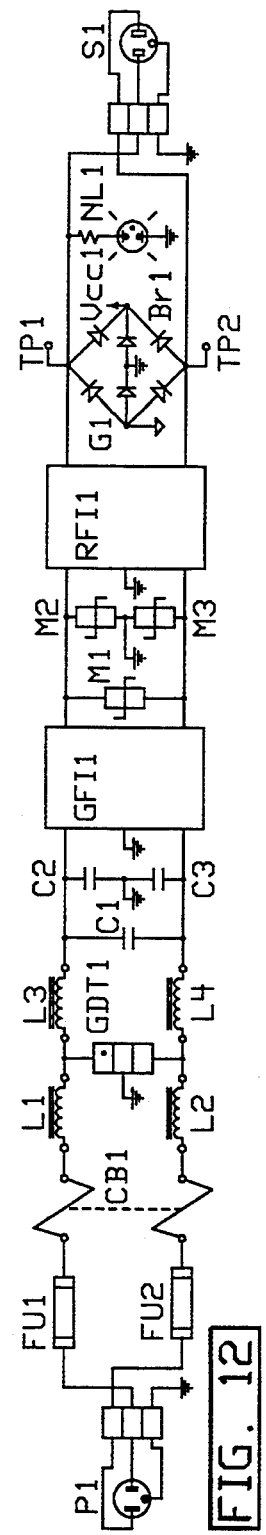
FIG. 10
FIG. 11
FIG. 12

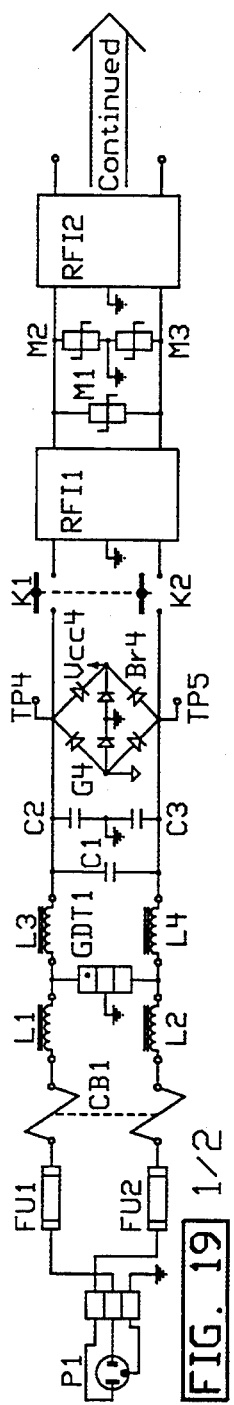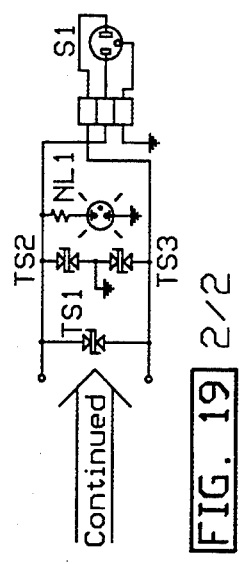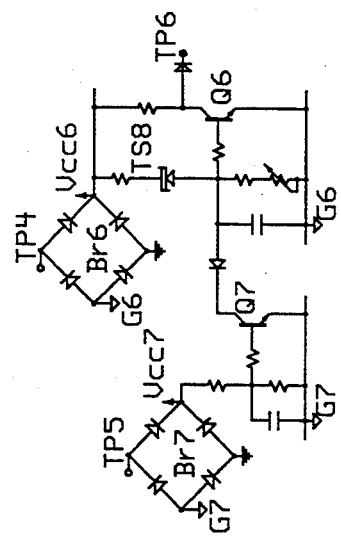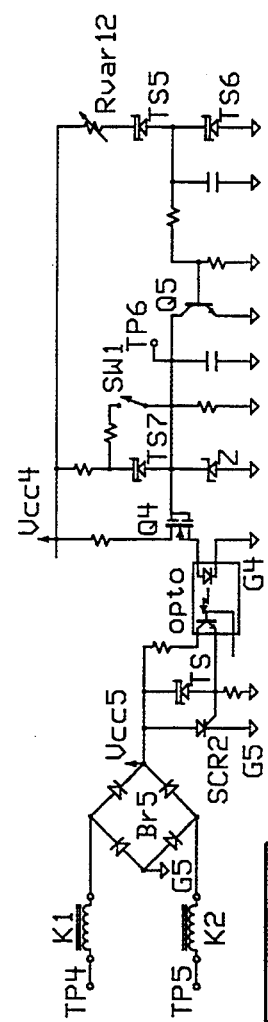

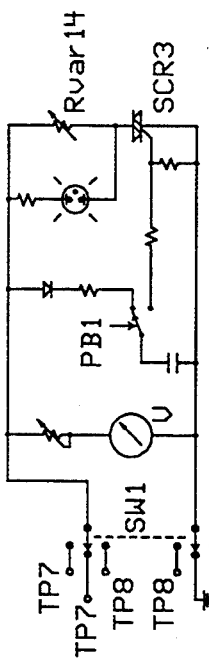
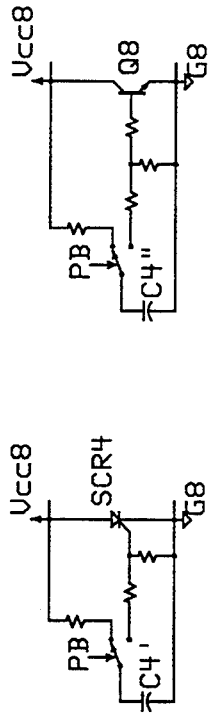
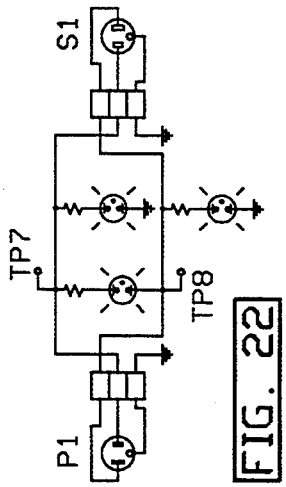
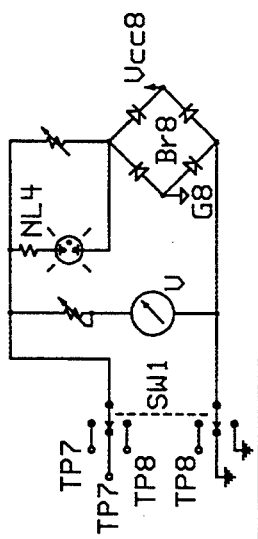
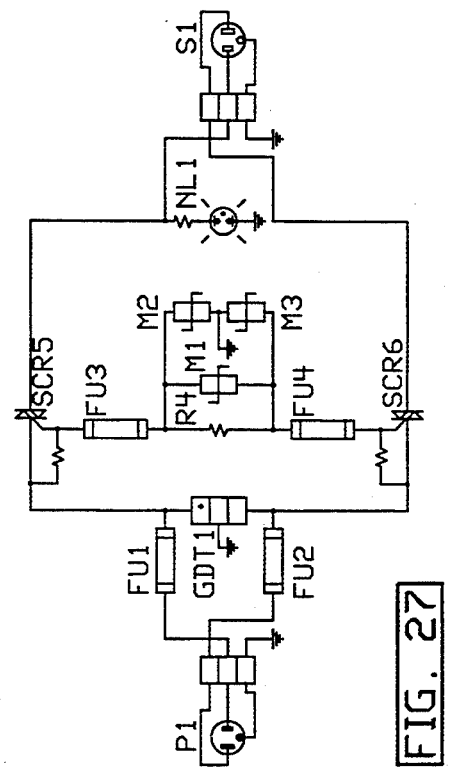

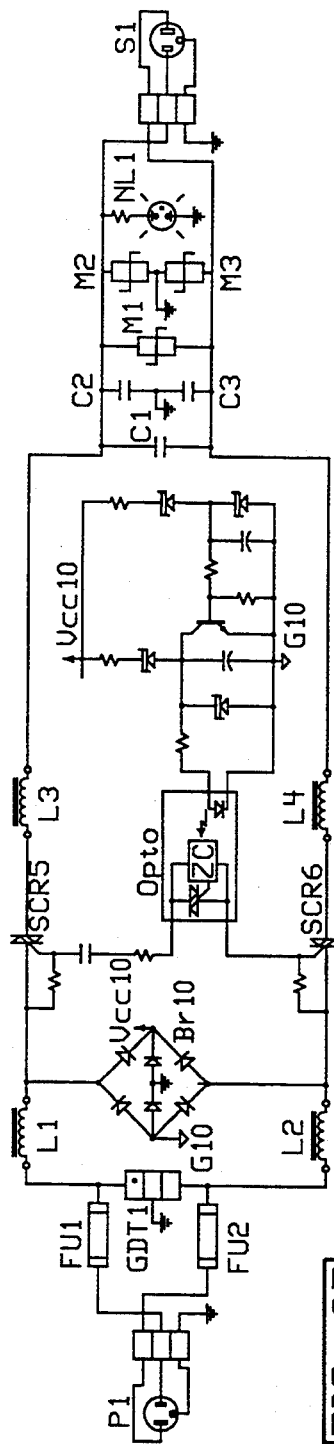
FIG. 37
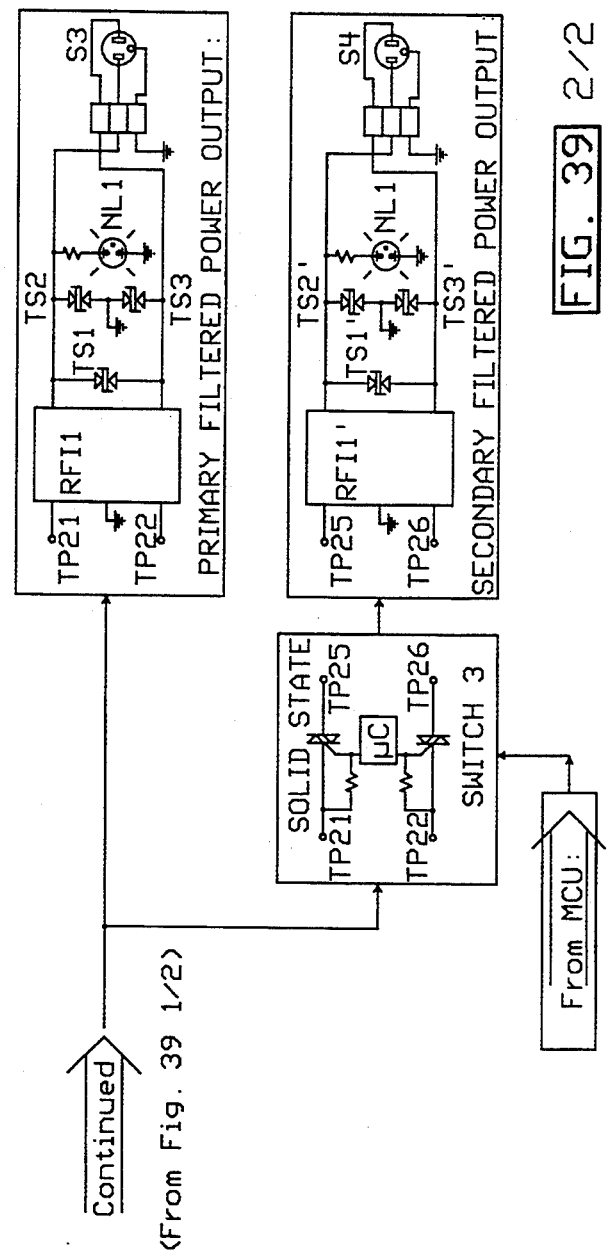
FIG. 39 2/2

1/2

2/2

POWER LINE PROTECTOR, MONITOR AND MANAGEMENT SYSTEM

CROSS-REFERENCE TO RELATED APPLICATIONS

This application is a continuation-in-part of applicant's application: "POWER LINE PROTECTOR, MONITOR AND MANAGEMENT SYSTEM" U.S. Ser. No. 07/684,167, filed Apr. 11, 1991, being abandoned herewith, which is a continuation-in-part of applicant's prior applications: "AUTO RESET CIRCUIT BREAKER" U.S. Ser. No. 06/833,360, filed Feb. 25, 1986, abandoned, which is a continuation-in-part of the applicant's prior application U.S. Ser. No. 664,472, filed Oct. 24, 1984, abandoned, and: Divisional Application U.S. Ser. No. 07/314,632, filed Feb. 22, 1989, now abandoned.

FIELD OF THE INVENTION

This invention generally relates to a multi-stage, multi-function power line protection, monitoring and management system, consisting of several stages of protection, which includes but is not limited to an intelligent microprocessor based controller which manages both the power source and the end user of the power, in response to predetermined functions and conditions, including but not limited to the conditions on the line and or the environment.

DESCRIPTION OF THE PRIOR ART

Power line protectors have been made and designed and built by several companies in the past, but they do not provide all the functions necessary to protect sensitive electronic equipment from surges and lightning. They do not have the multiple stages necessary to protect themselves and the attached equipment. They invariably have several short comings which allow the destruction of not only the equipment they are supposed to protect, in the case of sever surge and lightning, but most frequently, alas even the surge protector itself ends up being non-serviceable.

The present invention is described more particularly in the summary and the detailed description as follows.

SUMMARY OF THE INVENTION

In accordance with the present invention, the Power Line Protector, Monitor and Management System (PMS) is furnished with the following:

1) A superior over-voltage protection system, that includes multi-stage surge, noise and transient protection, that not only withstands the high energy lightning pulses, but also the fast rise transients, without letting any of the destructive energy through to the equipment being protected, through a series of cascaded primary, secondary and tertiary protective stages.

2) A superior over-current protection system, that includes not only over current protection in multiple stages, but also multi-stage ground-fault protection to protect both the end-user as well as the equipment. Including but not limited to the detection of the presence of proper (solid) ground, as well as the detection of the proper phase and neutral polarity, and/or phase loss or reversal, both at the onset and during the entire operation of the system, and through the generation of pseudo-ground within the system, providing continued protection at all times.

3) An intelligent supervision means that monitors the environment at all times for various physical and software conditions and accordingly switches the power source(s) and the load(s) ON or OFF as desired, thus managing the power environment, and as a means of storing data on power-supply conditions, as well as controlling and managing the usage of the same.

A line of power line protectors consisting of several stages of over voltage, over current and noise filtration systems are presented for various applications. Most include several stages of in-line filters consisting of inductors and capacitors which slow down fast incoming transients but do not impede the 50, 60 or 400 hertz sign wave of the nominal power on the line, thus allowing a gas tube protector to activate in a timely fashion. Once activated, the gas tube dissipates all the surge voltage and current (energy) to ground, thus allowing safety to the rest of the circuitry and protecting it from the brunt of the high voltage and or current which would be normal to a surge and lightning.

The next stage consists of yet another noise and transient line filter which filters the noise and transients from line to line, and line to ground. This further impedes the transients from entering the system.

The next stage includes one of the essences of this invention. It consists of three capacitors which additionally perform a unique function besides functioning as a noise filter and slowing down fast transients. These three capacitors provide pseudo-ground, which is very essential to the over all performance of the protector relating to the ground-fault protection in the system. The next stage, a ground fault interrupter circuit (GFI), a standard product available in any hardware store, protects the system and the hardware user from any ground faults, and any leakage to earth ground, which can cause electrocution and equipment failure. Nonetheless, the GFI will not function adequately or properly if there is no ground on the line or if there is no ground reference provided. However, the pseudo-ground stage described above, allows the GFI to function even in the absence of proper ground connection to the system. The purpose of the GFI will be further described in the detailed description of the preferred embodiment.

Yet another stage consists of metal oxide varistors (MOV) which provide line to ground and line to line transient protection and limit the voltage across the equipment connected across the line, to a safe value. This stage forms the secondary protection, providing a medium class noise and transient protection.

The next stage consists of tertiary protection, which provides the finely tuned transient protection for the whole power surge and lightning protector. This stage primarily consists of a six diode bridge (as described in the earlier invention: "AUTO RESET CIRCUIT BREAKER" U.S. Ser. No. 833,360, filed Feb. 25, 1986, which is a continuation-in-part of the applicant's prior application U.S. Ser. No. 664,472, filed Oct. 10, 1984, and a divisional Application U.S. Ser. No. 833,632, filed Feb. 22, 1989).

The six diodes provide line to line and line to ground rectification which, along with a Transient protector, form a tertiary voltage protector, that clamps and limits the voltage across the line, line to line and line to ground. This stage thus provides precise and fast transient protection as prescribed by transient suppressor and assisted by an SCR assisted transient protector.

A flow of current from line to line and/or line to ground in the MOVs (secondary stage) or as steered by the diodes in the bridge circuit (tertiary stage) would represent a ground fault current which is then sensed by the GFI which shuts OFF. Thus the input is separated from the output and the equipment and the solid state protection stages are totally protected and isolated from the power source, rendering them safe from the surges and the transients. During this time, the primary protector, the gas tube GDT continues to stay on protecting the line and the input of the GFI from any subsequent damage while the equipment remains connected and protected with the secondary and tertiary protection stages at all times.

Yet another stage includes intelligence, such as a microprocessor, which continuously monitors and responds to the conditions on the power line and/or the power load and in accordance with other predetermined internal and/or external hardware or software conditions switches ON or OFF the power source(s) and/or the load(s).

BRIEF DESCRIPTION OF THE DRAWINGS

FIGS. 1, 2 and 3 represent schematic diagrams of multistage power line over voltage and over current protectors in varying stages.

FIG. 3 represents an improvement in the primary and final stages of protection of FIGS. 1 and 2.

FIG. 4 depicts the protective devices of FIG. 3 in light of a new embodiment of this invention.

FIG. 5, 6, 7 and 8 represents yet another new embodiment of this invention, using new symbols for the protective devices described earlier.

FIG. 9 is the circuit diagram of the power line protector according to FIG. 4 using the modified protective devices of FIGS. 5, 6, 7, and 8.

FIGS. 10, 11, and 12 are similar to FIGS. 1, 2 and 3 wherein the tertiary protection includes the control circuits of FIGS. 13, 14, 15, 16 and 17 in varying combinations.

FIG. 18 and 19 represent automatic power line protectors wherein the isolation between the supply and the load is by means of an electro-mechanical device in response to the control circuits of FIG. 20, or FIGS. 20 and 21, wherein the system automatically resumes (restores) power after the power line problem has dissipated.

FIG. 19 is a fuller rendition of FIG. 18, wherein a tertiary stage of noise and transient protection has been added.

FIGS. 20 and 21 are control circuits for FIGS. 18 and 19.

FIG. 21 produces a low output when the voltage across any two lines, Hot, Neutral or Ground lines is above or below a given threshold, thus turning the system OFF, in conjunction with the control circuit of FIG. 20.

FIGS. 22, 23, 24, 25 and 26 represent circuits for verifying proper ground (ground integrity check circuits).

FIGS. 27 and 28 denote schematics for a basic low cost version of a multi stage surge protector using solid state isolation means (in place of the electro-mechanical isolating means shown in FIGS. 18 and 19) for isolating the power supply from the load (equipment) under various fault conditions.

FIG. 33 illustrates the concept of "JATKA LED" circuit wherein very low power is used to drive the LED.

FIG. 34 produces a photo trigger signal, enabling the solid state switching means, when a minimum voltage is present across the line and negates the signal when the voltage across the line is in excess of a desired limit.

FIG. 35 likewise produces a photo trigger pulse when a minimum voltage is across the line. The circuit additionally includes a zero-crossing detector which enables the solid state switches of FIG. 32.

FIG. 37 represents a version of the fully automatic solid state powerline protector in accordance with the present invention.

DETAILED DESCRIPTION OF THE PREFERRED EMBODIMENTS

Figure 16:
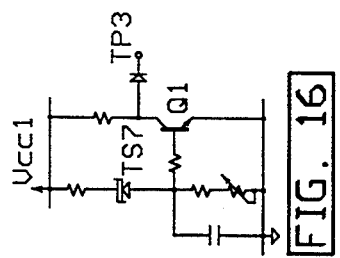
FIG. 16 represents low voltage (brown out) protection circuit to be used in conjunction with FIGS. 14 or 15.

FIGS. 1, 2 and 3 represent schematic diagrams of multistage power line, over voltage and over current protectors in various forms.

FIG. 1 represents the schematic diagram of the power line protector in its basic form, consisting of two stages of over voltage protection including the three element gas discharge tube GDT 1, which is a relatively slow reacting device, responding to an over-voltage condition in the order of 0.1 to 10 micro seconds. GDT 1 together with the inductors L1 and L2 form the first stage of overvoltage protection. The inductors L1 thru L4 together with the capacitors C1, C2 and C3 form the next stage, which slows down fast incoming transients but does not impede the 50, 60 or 400 hertz sign wave of the nominal power on the line, thus allowing the gas tube GDT 1 to activate in a timely fashion. Once activated, the gas tube dissipates all the surge voltage and current (energy) to ground, thus protecting the rest of the circuitry from the brunt of the high voltage and/or current which would be nominal to surge and/or lightning. In addition this stage performs the following functions:

a) Noise filtration. As a low pass filter, it filters out spurious noise on the line.
b) Slow down the very fast transients on the line.
c) The capacitors form a pseudo ground on the line allowing the subsequent stages to function properly even in the absence of proper ground. This preferred embodiment will be better understood after the next two stages are explained.

Additionally by placing the gas tube after the inductors L1 and L2, but before the inductors L3 and L4 connecting to the capacitors C1–C3, a voltage divider is created. This allows the GDT 1 to trigger in a timely fashion, without unduly stressing the capacitors with high voltage.

Next stage is the Ground Fault Circuit Interrupter (GFI 1). The function of which is well known to the prior art. In its normal function, it protects the system and the hardware user from any ground faults, and any leakage to earth ground, preventing electrocution and equipment failure. Nonetheless, the GFI will not function adequately or properly if there is no ground on the line or if there is no ground reference provided. However, the pseudo-ground stage described above, allows the GFI to function even in the absence of proper ground connection to the system.

The next stage consists of metal oxide varistors which provide line to ground and line to line transient protection and limit the voltage across the equipment connected across the line, to a safe value. This stage forms the secondary protection, providing a medium class noise and transient protection.

FIG. 2 includes yet another stage to the protector described above. In this stage, an additional noise filter RFI 1 combined with the tertiary over voltage protection consisting of silicon Transient Voltage Supressors, TS1, TS2 and TS3 react in sub nano seconds, providing a very well defined transient voltage protection.

FIG. 3 further includes a) fuses FU 1 and FU 2, and a double-pole thermo magnetic circuit breaker CB1. These devices provide overcurrent protection in different forms and functions, providing an over-all means of protection, by protecting the protection devices. The fuses by design, react much faster than the circuit breaker and are useful in the case of an instantaneous severe surge condition. The double-pole circuit breaker on the other hand operates under more sustained conditions even at much lower currents. b) a neon lamp NL1 with its series resistor R1, is connected across hot and ground at the output, and provides the vital information on the ground and power. Thus FIG. 3 represents a complete, stand alone power line protector including all the vital stages of a good over-current and over-voltage protector.

FIG. 4 depicts the protective devices of FIG. 3 in light of a new embodiment of this invention. GDT1, C1, C2, C3, M1, M2, M3, TS1, TS2, and TS3 are shown in their new symbols respectively in the schematic. These devices have a separate input lead and a separate output lead. The purpose of the added feature as shown in the schematic (symbols) is that a maximum possible surge and transient voltage protection is achieved since the output is straight across the protective element and any voltage drop developed across the input lead to the device is not seen by the next stage, thus providing an optimum (maximum possible) over voltage protection available by the use of each device. Additionally since it not physically possible to put all the protection elements in one spot, the incoming earth ground is connected to the GDT1 incoming earth ground, and its output ground is connected to the capacitor bridge ground. Thus all the grounds in and out are daisy chained through to the power output. This way the equipment to be protected is maintained at the maximum potential allowed by the final stage of protection.

FIG. 5, 6, 7 and 8 represents yet another new embodiment of this invention, using new symbols for the protective devices described earlier in FIG. 4. Most significant is the addition of yet another embodiment of this invention which relates to combining thermal overcurrent protection in the form of Positive Temperature Coefficient Resistors (PTC) Rvar1 thru Rvar10, which are integrated with their respective protective devices, GDT, MOVs and the transient suppressor as shown in FIGS. 5, 7 and 8. In normal operation the resistors exhibit minimal resistance. However, in a fault condition, the protective device would begin to heat up causing the PTC devices fused on its body also to heat up, additionally the PTC device also heats up due to the fault current flowing thru it. Thus both of these heat sources cause the PTC nominal resistance to go up drastically, causing the current flowing to the device to foldback, relieving the protective device of any potential destruction. Furthermore, the devices consists of a whole package, thus a balance is maintained and the equipment is totally protected in all events, line to line and line to ground. The following stage therefore never sees any voltage greater than the voltage across the protective device itself. FIG. 6 is a new symbol for a optimum noise and transient filter. The power rating of the PTCs is designed to meet the needs of the components as well as the current rating required in the application.

FIG. 9 is the circuit diagram of the power line protector according to FIG. 4 using the modified protective devices of FIGS. 5, 6, 7, and 8. Thus it represents a complete, stand alone power line protector which includes all the vital stages of a good over-current and over-voltage protection according to the total protection principles just enumerated, providing an optimum (maximum possible) over voltage protection available by the use of each device used.

FIGS. 10, 11, and 12 are similar to FIGS. 1, 2 and 3 wherein the tertiary protection includes the control circuits of FIGS. 13, 14, 15, 16 and 17 in varying combinations, connected across the six element diode bridge Br1: Vcc and Ground G1. Thus FIGS. 10, 11 or 12 and other circuits described later, act as the master circuits which are controlled by the sub-circuits of FIGS. 13 thru 17.

Figure 13:
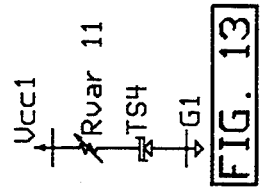
FIG. 13 represents basic over voltage and transient protection, used in conjunction with FIGS. 10, 11, 12 or any of the systems described later.

FIG. 13 represents basic over voltage and transient protection TS4, used in conjunction with FIGS. 10, 11, 12 or any of the systems described later. FIG. 13 includes a PTC resistor Rvar11, according to FIG. 8, in a form of a two leaded device. As the fault current increases thru the device, the PTC lets up, thus protecting the transient suppressor from a catastrophic failure. The line load is protected from instantaneous transients, while the GFI is triggered to turn OFF isolating the mains from the load.

Figure 15:
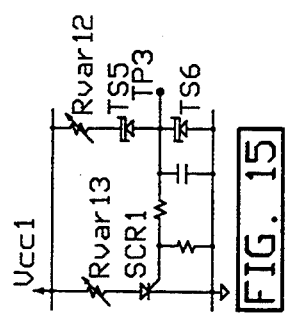
FIG. 14 and 15 represent improved transient and over voltage protectors.
Figure 14:
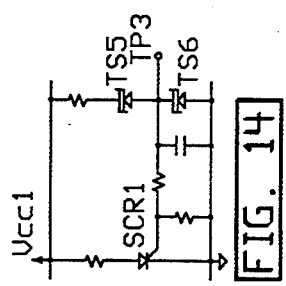

FIG. 14 and 15 represent improved transient and over voltage protectors.

FIG. 14 represents improved transient and over voltage protectors, by using a combination of transient voltage protectors and a SCR. TS5 triggers SCR1 and the brunt of the fault load is shared by the two in the circuit. At this time the GFI also senses the fault current due to some of it returning to ground, causing an imbalance in the current flowing in the mains. The GFI trips and isolates the mains from the equipment being protected.

FIG. 15 represents an improved version of FIG. 14, wherein the series resistors R2 and R3 of FIG. 14 are replaced with PTC resistors Rvar12 and Rvar13 respectively. This protects the transient and over voltage protective devices from blowing up while still providing instantaneous transient protection and allowing the GFI to respond.

FIG. 16 represents a low voltage (brown out) protection circuit to be used in conjunction with FIGS. 14 or 15. It includes transistor Q1 which is normally maintained in its ON state due to the presence of nominal AC (minimum) voltage on the line. If the line voltage drops below a minimum, TP3 which is connected to TP3 of FIG. 15 (or 14) is pulled high, causing the SCR1 to trigger and go into full conduction, resulting in the GFI triggering and isolating the line from the load.

Figure 17:
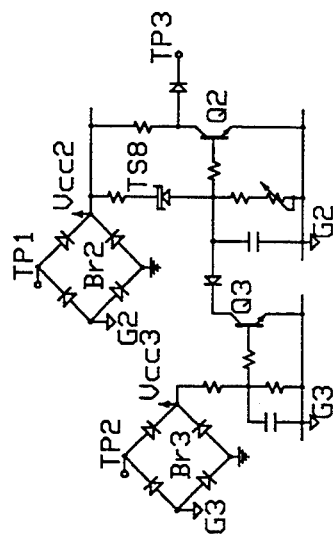
FIG. 17 is a circuit for verifying proper ground and phase polarity along with low voltage (brown out) protection for use in conjunction with the over voltage and transient protection of FIG. 14 or 15 in FIGS. 10, 11 or 12 and other circuits described later. The control circuits upon detecting any of the fault conditions, cause the system to shut down.

FIG. 17 is a circuit for verifying proper ground and phase polarity along with low voltage (brown out) protection for use in conjunction with the over voltage and transient protection of FIG. 14 or 15 by connecting to TP3. The diode bridge Br2 rectifies the voltage across hot and earth ground. The rectified DC voltage Vcc2/G2 then is checked for minimum line voltage, in the absence of which TP3 goes high, causing SCR1 to activate, causing the system to shut down as described earlier. This stage thus checks for proper phase and ground besides checking for a minimum voltage on the line (brown out protection).

Similarly, the diode bridge Br3 across neutral and earth ground, checks for phase reversal, i.e. if there is any spurious voltage on the neutral with respect to ground, Q3 is turned ON which in turn, turns OFF the system as described earlier.

Figure 18:
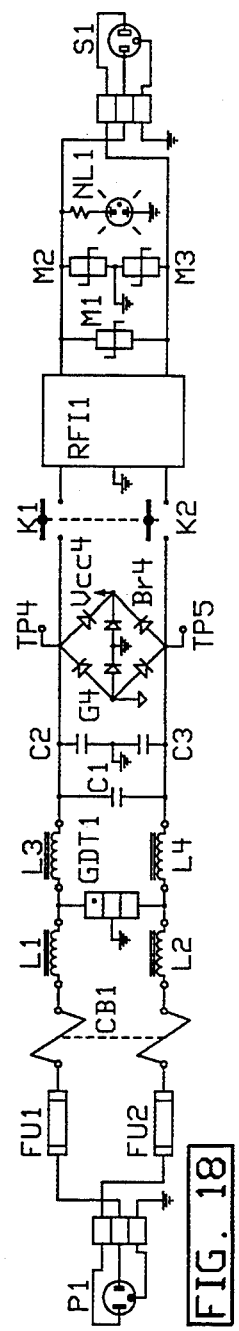

FIG. 18 and 19 represent automatic power line protectors wherein the isolation between the supply and the load is by means of an electro-mechanical device K1 and K2, which respond to the control circuits of FIG. 20, or FIGS. 20 and 21, wherein the system automatically resumes (restores) power after the power line problem has dissipated.

FIG. 19 is a fuller rendition of FIG. 18, wherein a tertiary stage of noise and transient protection has been added. The six diode bridge Br4 causes Vcc4 at minimum voltage to turn ON Q4, which in turn switches ON SCR2, turning ON K1 and K2. Over voltage on the other hand causes Q5 to turn ON, turning OFF Q4 and therefore, SCR2, K1 and K2, thus isolating the power line from the power load until the line returns to normal. There are built in delays built into the system provided by means of the capacitors in the respective circuits.

FIG. 21 produces a low output at TP6, when the voltage across any two lines, Hot, Neutral or Ground lines is above or below a given threshold. This turns OFF Q4, in FIG. 20, thus turning the system OFF as described earlier. FIG. 21 is very similar in function to FIG. 17 described earlier.

FIGS. 22, 23, 24, 25 and 26 represent circuits for verifying proper ground (ground integrity check circuits).

FIG. 22 is the basic circuit that represents the standard off the shelf type of hot, neutral and ground verification device.

FIG. 23 is a schematic for the measurement of the line voltage under applied load, across line to line and line to ground. A 3pdt switch is used to select the pair across which the integrity measurement is to be made. Capacitor C4 is normally fully charged to the peak line voltage. By depressing PBspdt switch the triac SCR3 places a load across the line to be measured for a finite period. The voltage is thus measured by the voltmeter under a load condition. When hot to ground is being measured, the integrity of the ground is checked. Thus FIG. 22 and 23, as a combination, may be used as an independent Line Condition Monitor or it may be integral to a more complete power line protector. FIG. 24 together with FIG. 25 or 26 is another variation of FIG. 23, and may be used together with FIG. 22.

Figure 28:
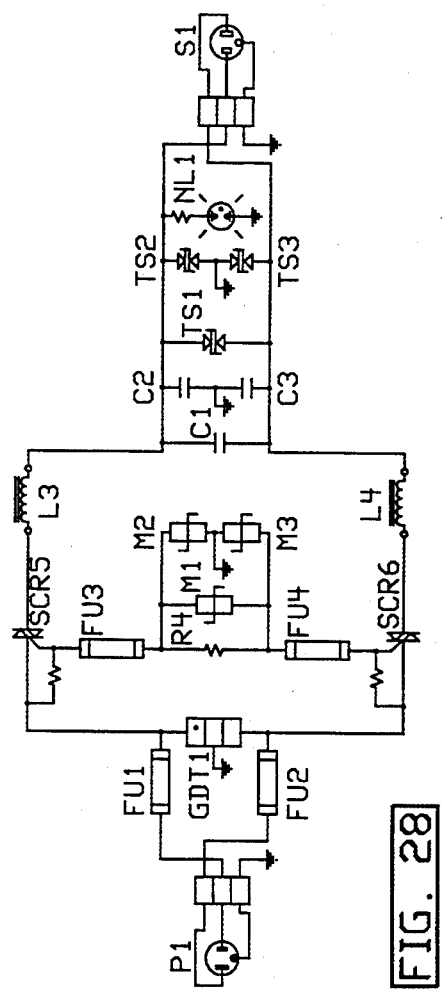

FIGS. 27 and 28 denote schematics for a basic low cost version of a multi stage surge protector using solid state isolation means (in place of the electro-mechanical isolating means shown in FIGS. 18 and 19) for isolating the power supply from the load (equipment) under various fault conditions.

FIG. 28 represents a more complete version. The Triacs, SCR5 and SCR6, forming the solid state switch are normally triggered by means of the resistor R1 across the gates of the two devices. In the event, there is an undue surge or transient on the line, one of the appropriately rated fuse FU3 and or FU4 will blow causing an interruption on the supply of power to the output (load). It will be easily seen that the load remains protected at all times. The integrity of the system is further preserved by low cost in line fuses FU1 and FU2.

Figure 30:
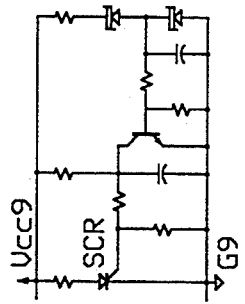
FIGS. 30 and 31 represents the control circuit for FIG. 29.
Figure 31:
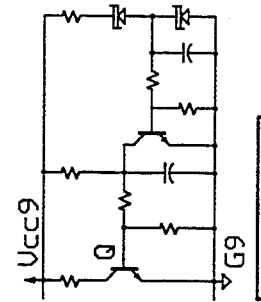
Figure 29:
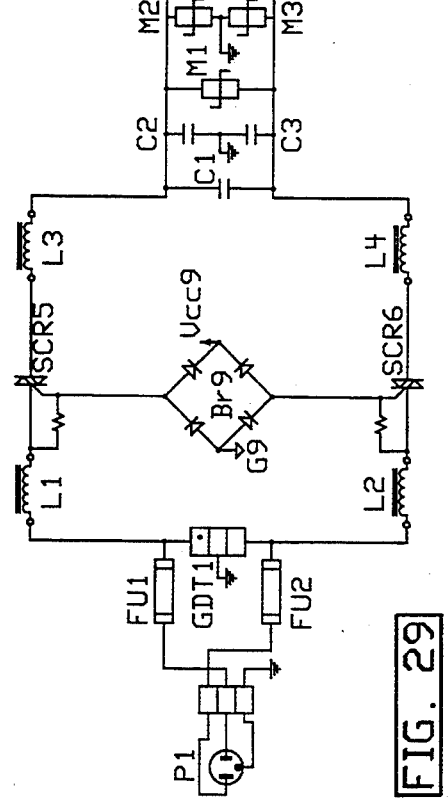
FIG. 29 is a schematic similar to that of FIG. 27. However, the solid state isolation means is self resetting and it responds to a control circuits of FIG. 30 or 31.

FIG. 29 is a schematic similar to that of FIGS. 27 and 28, however the solid state isolation means (solid state switch) is self resetting and it responds to one of the control circuits of FIG. 30 or 31. In an over voltage or abnormal voltage condition the solid state switch is turned OFF while the line conditions remain abnormal.

FIGS. 30 and 31 represents the control circuit for FIG. 29 and function in very much the same way as the control circuits described earlier.

Figure 32:
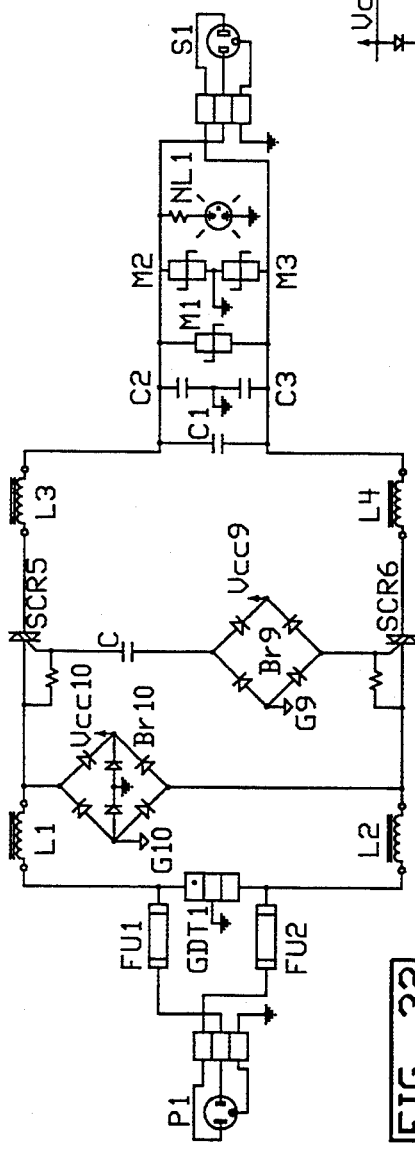
FIG. 32 represents yet another version of FIG. 29 wherein the line and load are separated by two lateral switches, which are turned ON only in a normal/nominal line voltage mode, under the control provided by circuits of FIGS. 33, 34, 34, 35 and 36 in different combinations.

FIG. 32 represents yet another version of FIG. 29, wherein the line and load are separated by two lateral solid state switches, which are turned ON only in a normal/nominal line voltage mode, under the control provided by circuits of FIGS. 33, 34, 34, 35 and 36 in different combinations.

FIGS. 33, 34, 35 and 36 illustrate circuits that control the circuit of FIG. 32 and other similar circuits described above under different line conditions.

Figure 33:
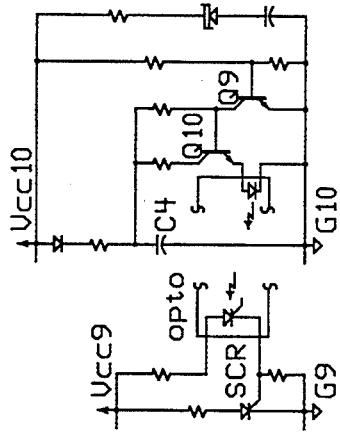
FIGS. 33, 34, 35 and 36 provide control of different circuits described above under different conditions.

FIG. 33 illustrates yet another preferred embodiment of this invention, the concept of "JATKA LED" circuit, wherein very low power is used to drive the LED. Capacitor C4 is slowly charged with a very small current during each half cycle. At zero-crossing, transistor Q9 is turned OFF causing transistor Q10 to go into full conduction turning the LED ON just for the brief period required to trigger the triacs. Thus it is not necessary to provide a rather large steady drain of current, but just a very small trickle charge to the capacitor C4.

Figure 34:
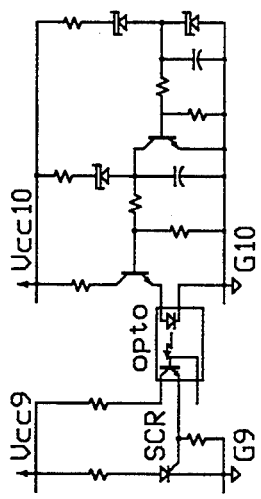

FIG. 34 circuit produces a photo trigger signal, enabling the solid state switch, when a required minimum voltage is present across the line, but negates the signal when the voltage across the line is in excess of a desired limit.

Figure 35:
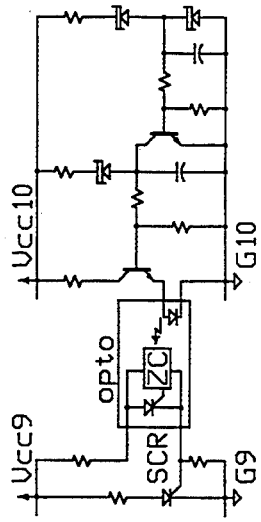

FIG. 35 likewise produces a photo trigger pulse when a required minimum voltage is present across the line. The circuit additionally includes a zero-crossing detector which enables the solid state switches of FIG. 32.

Figure 36:
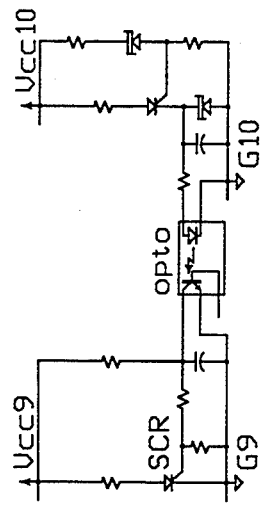

FIG. 36 represents another version of the control circuit.

FIG. 37 is a complete version of this fully automatic solid state powerline protector in accordance with the present invention, including high and low voltage protection. The power load is fully isolated and protected from an incoming power fault, even a sustained power cross. None of the existing third party systems will sustain a power cross condition, and still remain functional while continuing to protect the line load and equipment.

Figure 38:
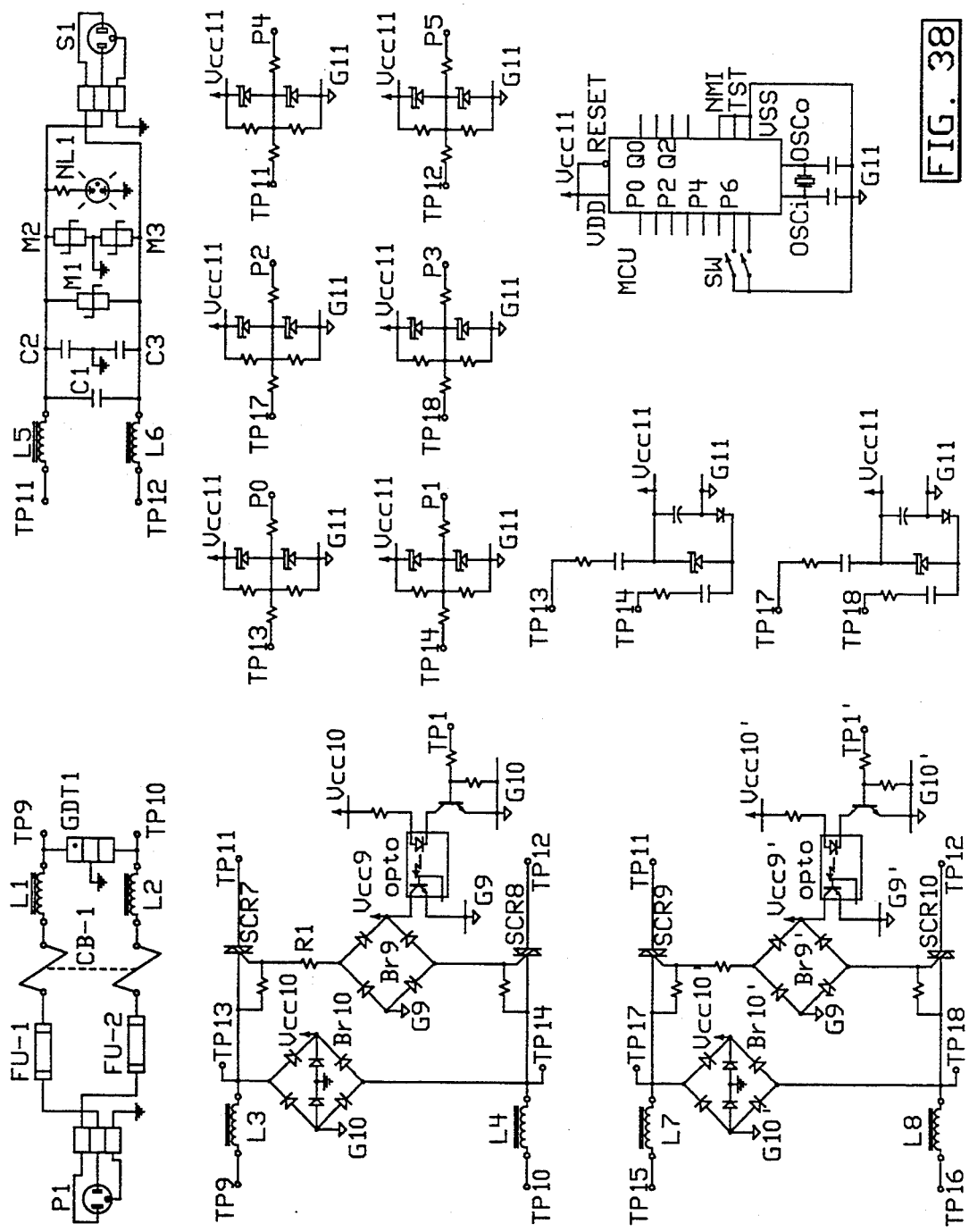
FIG. 38 represents the schematic diagrams of the building blocks that go together in the making of a PMS (Power Line Protector, Monitor and Management System), a microprocessor based (intelligent logic driven) power management system of the present invention.

FIG. 38 represents the schematic diagrams of the building blocks that go together in the making of a PMS (Power Line Protector, Monitor and Management System), a microprocessor based (intelligent logic driven) power management system of the present invention. Each line is measured/monitored via a very high impedance filter as shown in the figure. Only six are shown in the given example but the number used would vary according to specific applications. The microprocessor continuously intelligently monitors the incoming power for its various components:
- voltage levels (high/low)
- current across the switches and/or inductors to the load
- proper polarity and/or phase on the line
- presence of ground/leakage (GFI).

Figure 39:
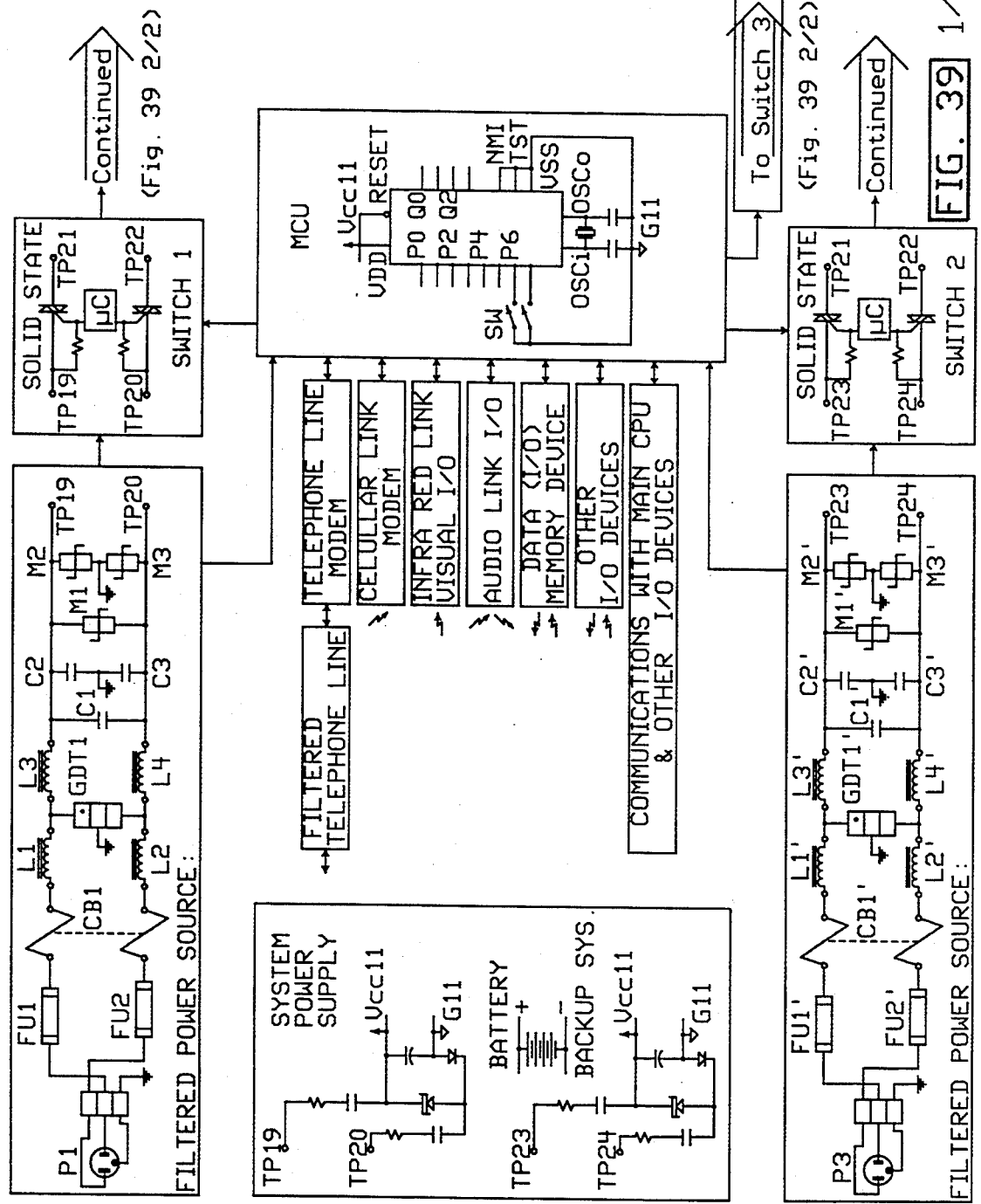
FIG. 39 represents the block diagram for PMS.

FIG. 39 represents the block diagram for PMS including two power sources P1 and P3, (P1 the primary power and P3 a secondary power such as a UPS) with their respective power filter circuits, and solid state switches controlled by a micro controller unit. The micro controller unit checks the voltages and currents across each line at all times and compares them to stored thresholds. The primary output $3 is powered ON by the most optimal power source through the enabling of the appropriate solid state switch. As required by the program, any supplemental filtered power output may be enabled by yet another solid state switch in series to it. The power for the microprocessor is derived from any of the available power sources. A battery backup system is continuously maintained in a full charge. In the case of a total power loss the microprocessor communicates with rest of the environment, thus allowing a systematic shut down. The microprocessor, as seen in the figure, additionally responds to several Input/Output (I/O) means. The added advantage, yet another preferred embodiment of this invention, is that the line and load, voltage and current being continuously monitored and modulated are managed by means of prediction or perception, i.e. at the start, a certain amount of over current is considered permissible, and even at full load, it may be managed by modulation. Any kind of ground fault current is also detected and the system systematically shuts down and, according to the software routine, restarts after the voltage and or current fault has been removed. Thus the system is fully automatic and even intelligent.

The microcomputer gets its inputs additionally from:
- key board(s), voice input and/or touch screens
- telephone line via modem
- BSR input/output (s)
- any other hardware or software With programmable inputs and outputs, including but not limited to voice recognition and voice response verification and execution of the different modes, sources, loads while providing complete system information and status, the system independently turns a multiplicity of external and even remote devices ON or OFF at zero crossing at defined intervals.

Figure 40:
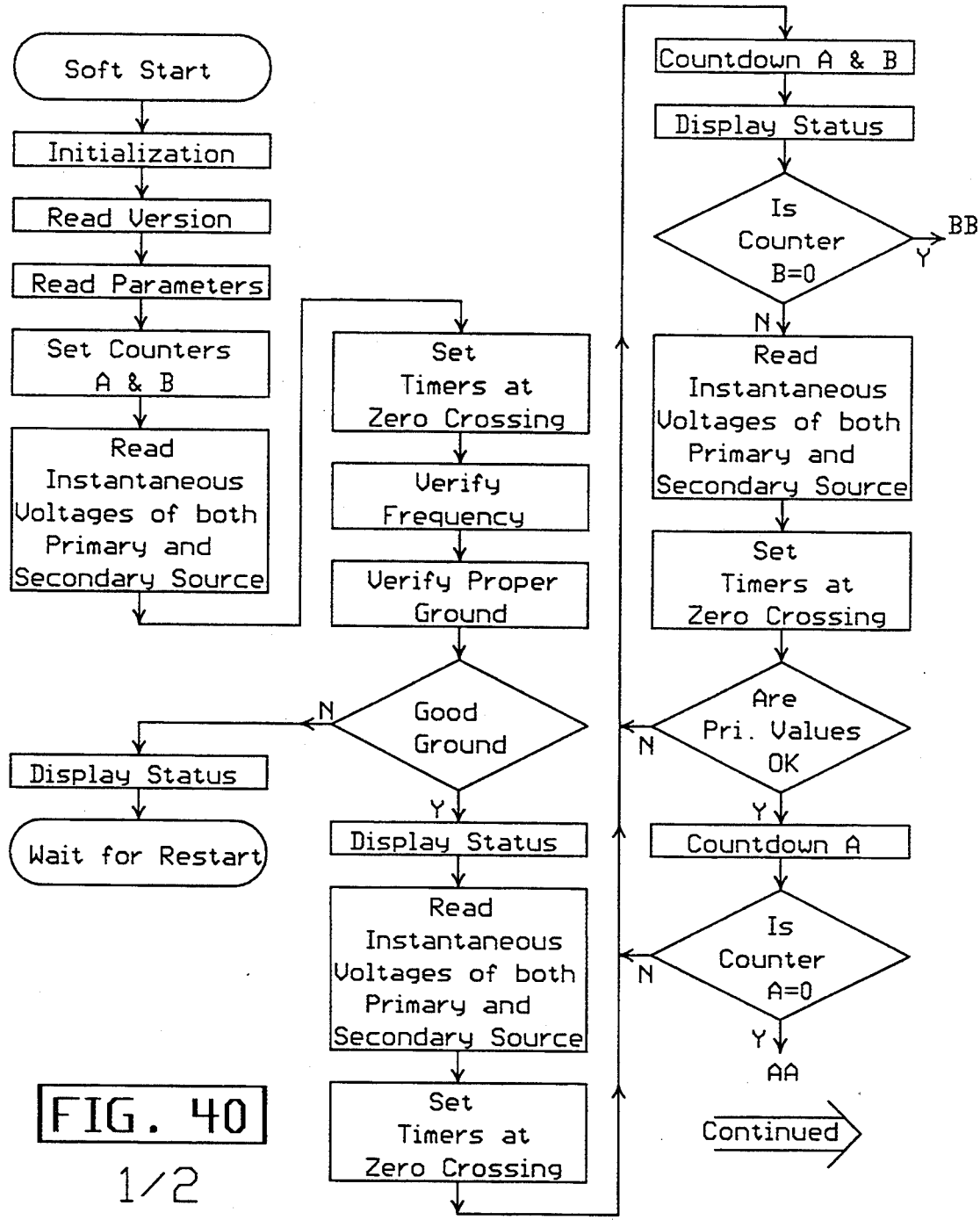
FIG. 40 represents the flow chart of one of the versions of PMS, including the preferred embodiment of the present invention.
Figure 40:
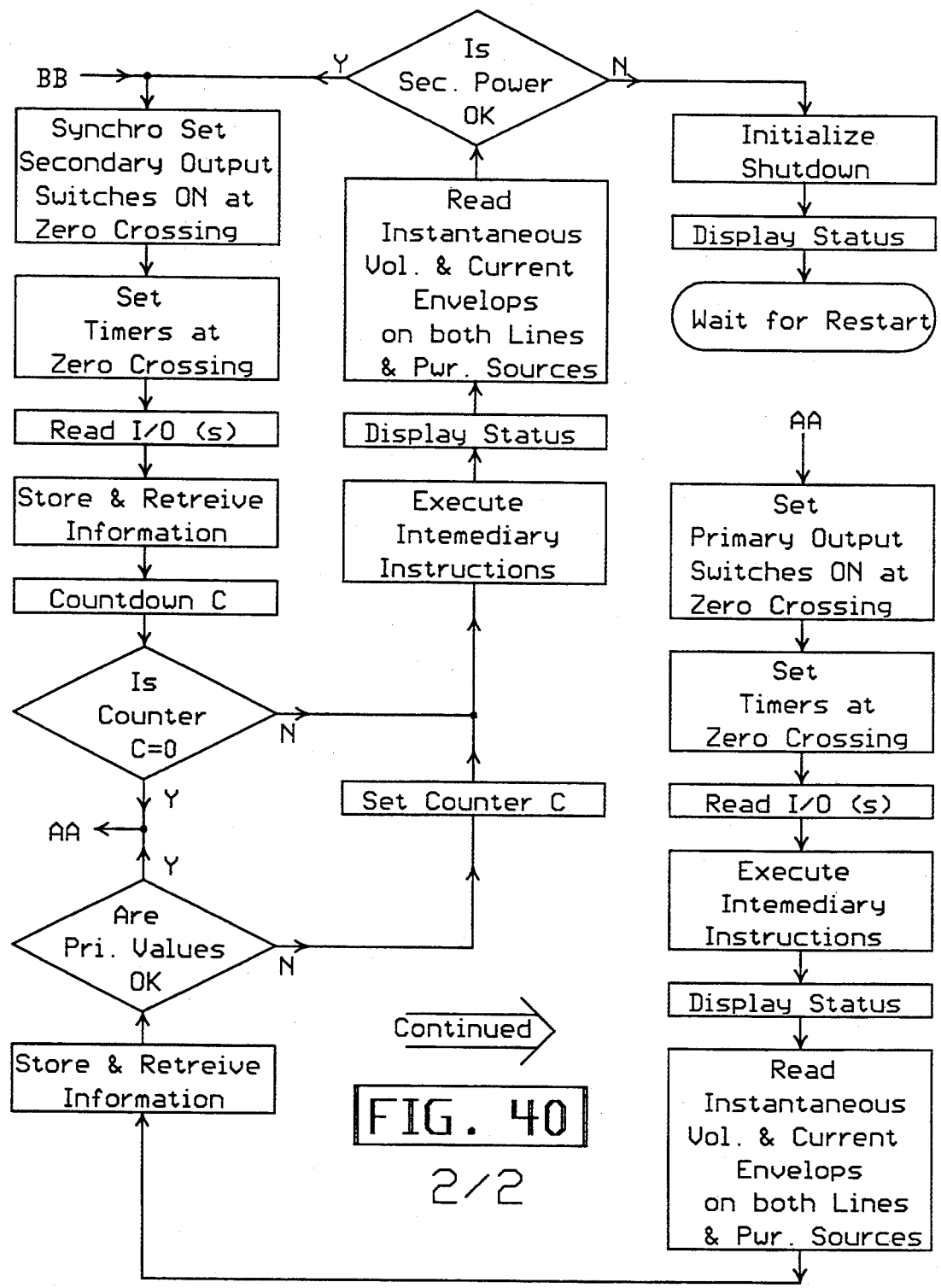

FIG. 40 represents a sample flow chart of one of the versions of PMS, as described in FIG. 39 above, including the preferred embodiment of the present invention. At the start all parameters are read and set. All current values are measured and checked against the norms preset and stored in the memory. Thus continuous monitoring of the voltages, currents and current balance on the line(s) and load(s) provides a total multi-stage, multi-functional power line protection, monitoring and management system, consisting of several stages of protection, which includes but is not limited to an intelligent microprocessor based controller which manages both the power source and the end user of the power, in response to predetermined functions and conditions, including but not limited to the conditions on the line and or the environment.

The software to run the microcomputer would include parameters such as input voltage and frequency and lock in on zero crossing of the voltage and/or current monitoring the same by prescribed parameters for under voltage or over voltage for its given frequency sampling and monitoring predictively every segment of the line wave for norm (including differential current). Likewise each power output from power management system would be monitored for over current and/or unbalance and a warning signal issued into one or more means of communications (CRT, voice output, printer, etc.) and when the over current or unbalance exceeds the prescribed (programmed) limit it would shut down the respective output.

Similarly if the input voltage slips outside a programmed norm it could switch its source to one or more power sources on standby. Other input means besides the keyboard include voice and/or data/modem communications for the system to manage the power environment.

Additionally, the system provides software controlled access to all inputs and outputs in the power controlled environment including an alarm and timer controls of power and data inputs and outputs, besides being able to function as a stand alone full function computer.

Many principles, modifications, versions and variations have been presented in the foregoing disclosure in order to illustrate the different elements of power line protection, monitoring and management system of the present invention. Even if some of the individual elements are known and understood in the prior art, what is presented here are several complete and unique stand alone workable systems that provide maximum performance, reliability and cost to benefit ratio including the preferred embodiments.

I claim:

1. An apparatus for protecting, monitoring and managing AC/DC electrical line or a telecommunication line comprising:

(a) at least one switch means serially connected to said electrical line for enabling, disabling or interrupting the flow of an electrical current through said line in response to a control signal;

(b) at least one secondary voltage protector means connected across the output of said switch means and earth ground for providing protection from said line to said earth ground;

(c) means for monitoring first and second predetermined values, wherein said monitoring means including a programmable logic means generating said control signal in response to at least one of said first and second predetermined values to manage said switch means, thereby said switch means enables or disables said flow of said electric current in said line.

2. The apparatus according to claim 1, wherein said switch means includes an electro-mechanical switch.

3. The apparatus according to claim 1, wherein said switch means includes AC/DC solid state silicone switch.

4. The apparatus according to claim 1, wherein said switch means includes an electro-mechanical switch and AC/DC solid state silicone switch.

5. The apparatus according to claim 1, wherein said switch means includes a ground fault circuit interrupter.

6. The apparatus according to claim 1, wherein said first and second predetermined values are determined by programmed conditions.

7. The apparatus according to claim 1, wherein said first and second predetermined values are determined by external communication means.

8. The apparatus according to claim 1, further comprises at least one primary voltage protector means connected across the input of said switch means and earth ground for providing a primary voltage protection from said line to said earth ground.

9. The apparatus according to claim 1, wherein said apparatus is reduced into a monolithic integrated circuit.

10. The apparatus according to claim 1, further comprises at least one pair of lines, wherein each line of said pair of lines is connected to said switch means and to said secondary voltage protector means for providing protection from each of said lines of each said pair to the other line of said pair, and across each of said lines to said ground.

11. The apparatus according to claim 10, further comprises at least one primary voltage protector means connected across each input of said switch means and earth ground for providing a primary voltage protection from each of said lines to said earth ground.

12. The apparatus according to claim 11, further comprising at least one power source connected to the outputs of said pair of lines through at least one switch means for providing continuous backup supply of power to said outputs, wherein said switch means of each pair of lines is managed by at least one control means.

13. The apparatus according to claim 11, wherein said apparatus is reduced into a monolithic integrated circuit.

14. A power line circuit comprising:

a hot input, a neutral input and n ground input;

a hot output, a neutral output and a ground output;

a ground fault interrupter circuit means connected between said inputs and said outputs for enabling, disabling, or interrupting the flow of an electric current to a first secondary surge and transient protector connected across said hot and ground outputs of said ground fault interrupter circuit means.

15. The power line circuit according to claim 14, further comprising a second and third secondary surge and transient protectors connected across said hot to neutral and neutral to ground outputs of said ground fault interrupter circuit means.

16. The power line circuit according to claim 15, wherein said secondary protector includes a multi-line diode bridge circuit connected to each line to be protected;

said diode bridge circuit including a positive rail, a negative rail, at least one of each: first, second and third forward steering diodes connected across each of said hot, neutral and ground output lines, and said positive rail, and at least one of each: first, second and third reverse steering diodes connected across each of said hot neutral and ground lines, and said negative rail, at least one transient protection means connected to said positive and negative rails.

17. The power line circuit according to claim 14, further comprises at least one pseudo-ground means for providing a return path for a leakage current in the absence of a proper ground connection to said around input.

18. The power line circuit according to claim 17, wherein said pseudo-ground means includes at least one first capacitor connected across said neutral input and said ground input.

19. The power line circuit according to claim 18, further comprising at least one second capacitor connected across said hot input and said ground input, and at least one third capacitor connected across said hot input and said neutral input.

* * * * *